US010633587B2

(12) United States Patent
Aboulaich et al.

(10) Patent No.: US 10,633,587 B2
(45) Date of Patent: Apr. 28, 2020

(54) METHOD FOR PRODUCING A PHOTO-LUMINESCENT MATERIAL

(71) Applicants: Aledia, Grenoble (FR); Universite Blaise Pascal-Clermont II, Clermont Ferrand (FR); Centre National de la Recherche Scientifique, Paris (FR); Sigma Clermont, Aubiere (FR)

(72) Inventors: Abdelhay Aboulaich, Clermont-Ferrand (FR); Geneviève Chadeyron, Cebazat (FR); Rachid Mahiou, Clermont-Ferrand (FR)

(73) Assignees: Aledia, Grenoble (FR); Universite Clermont Auvergne, Clermont Ferrand (FR); Centre National de la Recherche Scientifique, Paris (FR); Sigma Clermont, Aubiere (FR)

( * ) Notice: Subject to any disclaimer, the term of this patent is extended or adjusted under 35 U.S.C. 154(b) by 419 days.

(21) Appl. No.: 15/504,904

(22) PCT Filed: Aug. 12, 2015

(86) PCT No.: PCT/FR2015/052198
§ 371 (c)(1),
(2) Date: Feb. 17, 2017

(87) PCT Pub. No.: WO2016/027027
PCT Pub. Date: Feb. 25, 2016

(65) Prior Publication Data
US 2017/0283697 A1    Oct. 5, 2017

(30) Foreign Application Priority Data
Aug. 19, 2014  (FR) ..................... 14 57877

(51) Int. Cl.
*C09K 11/77* (2006.01)
*C04B 35/505* (2006.01)
(Continued)

(52) U.S. Cl.
CPC ........ *C09K 11/7721* (2013.01); *C04B 35/505* (2013.01); *C04B 35/624* (2013.01);
(Continued)

(58) Field of Classification Search
CPC ............ C09K 11/7721; C09K 11/7774; C04B 35/486; C04B 35/505; C04B 35/624; C04B 35/62645; C04B 2235/95
(Continued)

(56) References Cited

U.S. PATENT DOCUMENTS
2009/0208398 A1    8/2009  Li et al.

FOREIGN PATENT DOCUMENTS
FR    2978448 A1    2/2013

OTHER PUBLICATIONS

Pu et al., "Synthesis and Luminescence Properties of (Y,Gd)(P,V)O4:Eu3+,Bi3+ Red Nano-phosphors with Enhanced Photoluminescence by Bi3+, Gd3+ Doping", May 26, 2013, Nano-Micro Letters 5(2), pp. 117-123. (Year: 2013).*
(Continued)

*Primary Examiner* — Matthew E. Hoban
*Assistant Examiner* — Lynne Edmondson
(74) *Attorney, Agent, or Firm* — Wolf, Greenfield & Sacks, P.C.

(57) ABSTRACT

A method for producing a photo-luminescent material, including the following steps: (1) producing, according to a sol-gel method, a sol and then a gel of first precursors of a first substance from the sol; (2) crushing the gel; (3) optionally, annealing the gel in order to form first particles of the
(Continued)

first substance of which the average size is between 1 pm and 20 um; (4) producing a colloidal dispersion of second particles of a second substance, different from the first substance or identical to the first substance, of which the average size is between 5 nm and 400 nm; (5) mixing the colloidal dispersion with the sol in step (1) before forming the gel or with the first particles after step (3); and (6) annealing the mixture obtained in step (5), resulting in an increase in the compactness of the mixture, the average size of the second particles after annealing being between 100 nm and 900 nm. A photo-luminescent material including a mixture of first particles of a first photo-luminescent substance of which the average size is between 1 pm and 20 pm and second particles of a second photo-luminescent substance, different from the first photo-luminescent substance or identical to the first photo-luminescent substance, of which the average size is between 100 nm and 900 nm.

6 Claims, 5 Drawing Sheets

(51) Int. Cl.
*C04B 35/624* (2006.01)
*C04B 35/626* (2006.01)

(52) U.S. Cl.
CPC .. *C04B 35/62645* (2013.01); *C04B 35/62695* (2013.01); *C09K 11/7774* (2013.01); *C04B 2235/95* (2013.01)

(58) Field of Classification Search
USPC .................................................. 428/158, 402
See application file for complete search history.

(56) References Cited

OTHER PUBLICATIONS

Machine translation of FR2978448A, 17 pages. (Year: 2013).*
Written Opinion of the International Searching Authority for Application No. PCT/FR2015/052198 dated Oct. 14, 2015.
International Search Report for Application No. PCT/FR2015/052198 dated Oct. 14, 2015.
Aboulaich et al., Ce-Doped YAG nanophosphor and red emitting CuInS2/ZnS Core/Shell quantum dots for warm white light-emitting diode with high color rendering index. ACS Applied Materials & Interfaces. 2014; 6(1): 252-8.
Potdevin et al., Sol-gel based YAG: Ce3+ powders for applications in LED devices. Phys. Stat. Sol. (C). 2007;4(1):65-9.
Potdevin et al., Sol-gel based YAG: Tb3+ or Eu3+ phosphors for application in lighting sources. Journal of Physics D: Applied Physics. 2005;(38): 3251-60.

* cited by examiner

METHOD FOR PRODUCING A PHOTO-LUMINESCENT MATERIAL

CROSS-REFERENCE TO RELATED APPLICATIONS

This application is the national phase of International Application No. PCT/FR2015/052198, filed on Aug. 12, 2015, which claims priority to French Patent Application No. 14/57877, filed on Aug. 19, 2014, which applications are incorporated herein by reference to the maximum extent allowable.

BACKGROUND

The present application relates to photoluminescent materials, particularly aluminates having luminescence properties, and to methods of preparing such photoluminescent materials.

DISCUSSION OF THE RELATED ART

Photoluminescent materials are particularly used to prepare fluorescent coatings, in particular to manufacture display screens, projectors, particularly plasma screens, lamps for the backlighting of liquid crystal displays, light-emitting diodes, plasma lamps, trichromatic lamps, etc.

An example of a photoluminescent material is yttrium aluminum garnet (YAG) activated by the trivalent cerium ion, also called YAG:Ce or YAG:$Ce^{3+}$. Such a photoluminescent material is particularly used to generate white light after being associated with a blue light-emitting diode (LED). To achieve this, the blue LED is covered with a coating containing YAG:$Ce^{3+}$ particles. Part of the blue light is converted into yellow light by the photoluminescent coating, which provides the white light.

Photoluminescent materials, particularly of YAG:Ce type, are generally manufactured by solid-state reactions. Solid precursors of aluminum, of yttrium, and of cerium, in the form of powders, are mixed, ground, and heated up to high temperatures, for example, to temperatures higher than 1,600° C., to form a powder of particles having the desired composition and crystalline phase. An anneal of the powder is then carried out under a reducing atmosphere, generally in hydrogen ($H_2$), to reduce the $Ce^{4+}$ ions, which have no photoluminescence properties and which act as traps for the charge carriers, into $Ce^{3+}$ ions which have the desired photoluminescence properties.

A manufacturing method by solid-state reactions has several disadvantages. Indeed, it may be difficult to obtain powders of precursors with a low particle size variability. It may further be difficult to achieve a perfectly homogeneous mixture of the precursor powders. The obtained photoluminescent material powder may then have a heterogeneous chemical composition, which will result in a decrease in the intensity of the photoluminescence of the material. Further, the step of annealing under a reducing atmosphere is a step which may be difficult to implement due to the dangerousness of hydrogen.

The forming of a YAG:Ce compound by a sol-gel method is known. The use of the sol-gel method enables to overcome most of the disadvantages associated with solid-state reactions since the mixture of precursors is formed and controlled in solution at the molecular scale. In particular, a better chemical homogeneity, a better distribution of the $Ce^{3+}$ ion in the YAG matrix and a lower particle size variability are obtained. However, the light efficiency performance of the YAG:Ce compounds obtained by current sol-gel methods are much lower than those of YAG compounds manufactured by solid-phase reactions.

SUMMARY

An object of an embodiment aims at overcoming all or part of the disadvantages of photoluminescent materials and of methods of manufacturing such previously-described materials.

Another object of an embodiment is for the photo-luminescent material to be formed by a method different from a solid-state reaction method.

Another object of an embodiment is for the photo-luminescent material to have photoluminescence properties similar to those of a photoluminescent material of same composition manufactured by a solid-state reaction method.

Thus, an embodiment provides a photoluminescent material comprising a mixture of first particles of a first photoluminescent substance having an average size in the range from 1 μm to 20 μm and of second particles of a second photo-luminescent substance, different from the first photoluminescent substance or identical to the first photoluminescent substance, having an average size in the range from 100 nm to 900 nm.

According to an embodiment, the first photoluminescent substance and the second photoluminescent substance each mainly comprise an yttrium aluminum oxide.

According to an embodiment, the first photoluminescent substance and the second photoluminescent substance each mainly comprise an yttrium aluminum oxide further containing at least one of the following elements: cerium, europium, chromium, neodymium, terbium, dysprosium, praseodymium, or gadolinium.

According to an embodiment, the mass ratio of the first particles and of the second particles is in the range from 0.01 to 99.

An embodiment also provides a method of manufacturing a photoluminescent material, comprising the steps of:

(1) manufacturing according to a sol-gel method a sol and then a gel of first precursors of a first substance from the sol;

(2) grinding the gel;

(3) possibly, annealing the gel to form first particles of the first substance having an average size in the range from 1 μm to 20 μm;

(4) manufacturing a colloidal dispersion of second particles of a second substance, different from the first substance or identical to the first substance, having an average size in the range from 5 nm to 400 nm;

(5) mixing the colloidal dispersion with the sol at step (1) before the forming of the gel or with the first particles after step (3); and (6) annealing the mixture obtained at step (5), which results in an increase in the compactness of the mixture, the average size of the second particles after anneal being in the range from 100 nm to 900 nm.

According to an embodiment, the anneal step at step (6) is carried out at a temperature in the range from 1,100° C. to 1,700° C.

According to an embodiment, step (4) comprises a step of solvothermal synthesis of the second particles.

According to an embodiment, the colloidal dispersion is in a solvent comprising at least one alcohol.

According to an embodiment, the first photoluminescent substance comprises YAG:Ce particles and the second photo-luminescent substance comprises YAG:Ce nanoparticles prepared by a solvothermal method.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

For clarity, the same elements have been designated with the same reference numerals in the different drawings. Further, in the following description, expressions "substantially", "around", and "approximately" mean "to within 10%".

Term "particle" such as used in the context of the present disclosure should be understood in a broad sense and corresponds not only to compact particles having a more or less spherical shape but also to angular particles, to flattened particles, to flake-shaped particles, to fiber-shaped particles, or to fibrous particles, etc. It should be understood that the "size" of particles in the context of the present invention means the smallest transverse dimension of the particles. As an example, in the case of fiber-shaped particles, the particle size corresponds to the diameter of the fibers. Particles of a material means the particles considered individually (that is, the unit elements of the material) knowing that the material may appear in the form of particle clusters.

Term "average size" means according to the present invention the particle size which is greater than the size of 50% by volume of the particles and smaller than the size of 50% by volume of the particles of a particle distribution. This corresponds to $d_{50}$. The grain-size distribution of the particles may be measured by laser granulometry by using, for example, a Malvern Mastersizer 2000.

Figure 1:
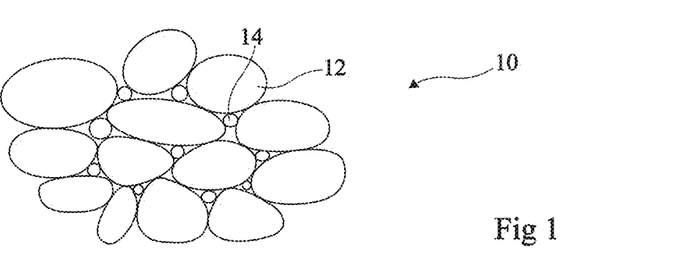
FIG. 1 is a partial simplified cross-section view of an embodiment of a photoluminescent material.

FIG. 1 is a partial simplified cross-section view of an embodiment of a photoluminescent material 10. Material 10 comprises first particles 12 of a first photoluminescent substance and second particles 14 of a second photoluminescent substance. The average size of second particles 14 is smaller than the average size of first particles 12. Particles 14 tend, in particular, to fill the spaces present between particles 12.

According to an embodiment, the average size of first particles 12 is in the range from 1 µm to 20 µm, preferably from 1 µm to 10 µm, more preferably from 1 µm to 8 µm. According to an embodiment, the average size of second particles 14 is in the range from 100 nm to 900 nm, preferably from 400 nm to 900 nm.

In the following description, the first particles are called microparticles and the second particles are called nanoparticles.

According to an embodiment, the first and second photoluminescent substances have substantially the same chemical composition. According to an embodiment, the first and second photoluminescent substances are different.

The first photoluminescent substance and the second photoluminescent substance may each independently be an aluminate or a silicate emitting light at a wavelength in the range from 400 to 700 nm under a light excitation having a wavelength in the range from 300 to 500 nm, or preferably from 400 to 480 nm. The second photoluminescent substance may also be a nitride, a fluoride, or a sulfide.

Preferably, the first photoluminescent substance and the second photoluminescent substance may each independently be an aluminate, particularly an yttrium-aluminum garnet according to the following formula (1):

$$(Y_{3-x}R^1_x)(Al_{5-y}R^2_y)O_{12} \quad (1)$$

where $R^1$ and $R^2$ are independently selected from the elements comprising rare earths, alkaline earths, and transition metals and x and y each independently vary from 0 to 1.5, preferably from 0 to 1. Preferably, $R^1$ and $R^2$ are independently selected from the group comprising cerium, samarium, gadolinium, silicon, barium, terbium, strontium, chromium, praseodymium, and gallium.

As an example of nitrides absorbing and emitting light in the desired wavelength ranges, the following can be mentioned: $CaAlSiN_3$:Eu, $(Ca,Sr)AlSiN_3$:Eu, $Ca_2Si_5N_8$:Eu, or $(Ca,Sr)Si_5N_8$:Eu.

As an example of fluorides absorbing and emitting light in the desired wavelengths, fluorides of formula $K_2MF_6$:Mn (where M may be Si, Ge, Sn, or Ti) can be mentioned.

As an example of sulfides absorbing and emitting light in the desired wavelength ranges, the following can be mentioned: CaS:Eu, SrCa:Eu, (Sr,Ca)S:Eu, and $SrGa_2S_4$:Eu.

As an example of aluminate absorbing and emitting light in the desired wavelength ranges, the following can be mentioned: $Y_3Al_5O_{12}$:Ce, $(Y,Gd)_3Al_5O_{12}$:Ce, $Tb_3Al_5O_{12}$, $(Y,Tb)_3Al_5O_{12}$, $Lu_3Al_5O_{12}$:Ce, and $Y_3(Al,Ga)_5O_{12}$.

As an example of silicates absorbing and emitting light in the desired wavelength ranges, the following can be mentioned: $(Sr,Ba)_2SiO_4$:Eu, $Sr_2SiO_4$:Eu, $Ba_2SiO_4$:Eu, $Ca_2SiO_4$:Eu, $Ca_3SiO_5$:Eu, and $Sr_3SiO_5$:Eu.

The mass ratio in photoluminescent material 10 between microparticles 12 and nanoparticles 14 is in the range from 0.01 to 99, preferably from 0.1 to 50, more preferably still from 0.4 to 10.

Figure 2:
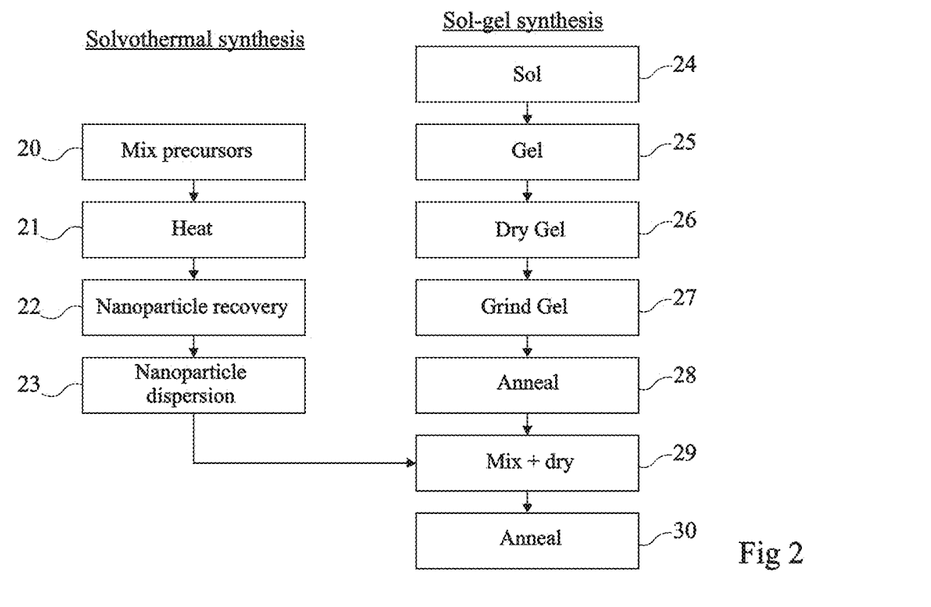
FIGS. 2, 3, and 4 each show, in the form of a block diagram, an embodiment of a method of manufacturing the photo-luminescent material shown in FIG. 1.

FIG. 2 shows, in the form of a block diagram, an embodiment of a method of manufacturing photoluminescent material 10 shown in FIG. 1.

According to an embodiment, the method comprises the manufacturing of nanoparticles 14 by solvothermal synthesis, the manufacturing of microparticles 12 by a sol-gel method, and the adding of nanoparticles 14 at one of the steps of the manufacturing of microparticles 12.

Steps 20 to 23 concern the manufacturing of nanoparticles by solvothermal synthesis.

At step 20, the method comprises mixing the precursors of the second photoluminescent substance in a first solvent or a mixture of first solvents, for example, a diol (also called glycol), a mixture of diols, or a solvent having a long saturated or unsaturated hydrocarbon chain mixed with a surface active agent. The first solvent may also be a surface active agent or a mixture of surface active agents such as oleic acid and oleylamine. In all cases, the first solvent or the mixture of first solvents both play the role of a solvent and of a stabilizer for the nanoparticles. The precursors may be acetates, nitrates, chlorides, and/or carbonates. As an example, in the case where the second photoluminescent substance is a YAG:Ce, a precursor of yttrium is hydrated yttrium acetate (III), a precursor of aluminum is aluminum isopropoxide, and a precursor of cerium is hydrated cerium acetate (III). A stirring of the mixture of precursors in the first solvent or the mixture of first solvents may be carried out. The method carries on at step 21.

At step 21, the obtained solution is heated, for example, in an autoclave, to promote reactions between the precursors. The heating temperature may be in the range from 100° C. to 300° C., preferably from 200° C. to 300° C., and more preferably still from 225° C. to 300° C. The heating time may be in the range from 30 minutes to a plurality of days, preferably from 30 min to 48 h, and more preferably still from 30 min to 4 h. The heating time particularly depends on the heating temperature, on the solvents, and on the precursors used. A colloidal dispersion of nanoparticles is obtained at the end of the heating step. The method carries on at step 22.

At step 22, a nanoparticle recovery step is carried out. This may comprise a step of precipitating the nanoparticles, for example, by addition of an antisolvent for nanoparticles. "Antisolvent" means any solvent which has no affinity for nanoparticles. The selection of the antisolvent will depend on the nature and on the surface chemistry of the nanoparticles, such solvents generally being aprotic polar solvents such as acetone or acetonitrile.

The solid phase containing the nanoparticles may be recovered by centrifugation. The remaining precursors which have not reacted and the products of parasitic reactions as well as the synthetic solvent(s) are thus removed. The nanoparticles are then dried, for example, at a temperature in the range from 25° C. to 80° C., for a time in the range from 1 h to 12 h. A nanoparticle powder is then obtained. The method carries on at step 23.

At step 23, a colloidal dispersion of the nanoparticles is formed by mixing the nanoparticles in a second solvent, for example, an alcohol. Preferably, the second solvent is different from the first solvent and has a boiling point lower than the boiling point of the first solvent. After step 23, the average nanoparticle size is in the range from 5 nm to 400 nm, preferably from 10 nm to 100 nm, and more preferably still from 30 nm to 50 nm.

The method further comprises steps 24 to 28 of microparticle manufacturing, by a sol-gel method, which may be carried out independently from steps 20 to 23 and possibly at least partly simultaneously thereto.

At step 24, the method comprises mixing the precursors of the first photoluminescent substance, for a sol-gel method, in a solvent capable of further containing at least one surface active agent. The precursors may be metal alkoxides and/or metal salts. As an example, in the case where the first photo-luminescent substance is a YAG:Ce, a precursor of yttrium is an anhydrous yttrium chloride ($YCl_3$), a precursor of aluminum is aluminum isopropoxide ($Al(OCH(CH_3)_2)_3$), and a precursor of cerium is anhydrous cerium chloride ($CeCl_3$). According to an embodiment, step 24 may comprise forming cerium and yttrium alkoxides from the chloride precursors. To achieve this, the $YCl_3$ and $CeCl_3$ precursors are for example first dissolved in an alcohol such as ethanol, isopropanol, or sodium ethanolate. After the dissolution, a solution A is obtained. Then, an alkaline alcoholic solution of sodium hydride NaH or of metal potassium K is added to solution A to trigger the hydrolysis reactions. If the solvent used is sodium ethanolate, it is not necessary to add an alkaline solution, sodium ethanolate itself being a strong base. The base is added while vigorously stirring and the mixture is heated up to a temperature at least equal to the boiling point of the solvent used, that is, 85° C. in the case of isopropanol. As soon as the alkaline solution has been added, an exothermal reaction can be observed and a white precipitate of sodium chloride NaCl or of potassium chloride KCl according to the nature of the base used, instantaneously forms, indicating the forming of cerium and yttrium alkoxide, that is, solution B. After one hour of heating, a determined quantity of aluminum isopropoxide is weighted and added to solution B. The reaction then carries on for several hours, for example, four hours, while still vigorously stirring at the above-mentioned temperature. At the end of the reaction and after cooling, the mixture is centrifuged, for example, at 4,700 revolutions per minute for several minutes, for example, 15 minutes, to separate the alkoxide solution from the white precipitate formed during the synthesis. The separation may also be performed by filtering. The centrifugation is repeated 3 times to make sure that all NaCl or KCl salts have been removed. At the end of each centrifugation, the transparent supernatant is retrieved and the white precipitate is removed. A clear solution is then obtained, that is, the sol. The method carries on at step 25.

At step 25, the condensation reactions carry on in the sol. An increase in the viscosity of the sol until the gel is obtained can be observed. The sol may be stirred for several hours. According to an embodiment, the sol stirring step may be carried out at a temperature in the range from 65° C. to 80° C. The method carries on at step 26.

At step 26, the method comprises drying the gel, for example, in an oven or in free air, at a temperature in the range from 25° C. to 90° C. The gel drying step may be carried out for a time in the range from 2 hours to 12 hours. The gel drying results in a densification of the gel as the solvent evaporates and as the condensation carries on. The material obtained at the end of step 26 which contains substantially no solvent is called xerogel. The method carries on at step 27.

At step 27, a white powder is obtained by a step of grinding the xerogel obtained at step 26. The grinding may be performed in a ball mill or in a mortar. The method carries on at step 28.

At step 28, a step of annealing the xerogel is carried out to obtain microparticles having the desired chemical composition and crystalline phase. The anneal step may be carried out at a temperature in the range from 1,000° C. to 1,800° C., preferably from 1,300° C. to 1,700° C. The anneal step may be carried out for a time in the range from 2 hours to 10 hours, preferably from 3 hours to 5 hours. The method carries on at step 29.

At step 29, according to an embodiment, the colloidal nanoparticle dispersion obtained at step 23 is mixed with the nanoparticle powder after the anneal of step 28. A drying step, for example, at a temperature between 25° C. and 90° C., and for a time in the range from 2 hours to 12 hours, may be provided to evaporate the solvent from the colloidal dispersion. A powder comprising a mixture of the microparticles and of the nanoparticles is obtained. The method carries on at step 30.

At step 30, a step of annealing the mixture obtained at step 29 is carried out to obtain the photoluminescent material according to the embodiment of FIG. 2. The anneal step may be carried out at a temperature in the range from 1,100° C. to 1,700° C., preferably from 1,300° C. to 1,700° C. The anneal step may be carried out for a time in the range from 2 hours to 10 hours, preferably from 3 hours to 5 hours. The nanoparticle size tends to increase during step 30. After anneal step 30, the average nanoparticle size is in the range from 100 nm to 900 nm, preferably from 400 nm to 900 nm.

The inventors have shown that at this step, the at least part of, preferably of most of, more preferably substantially of all of, the cerium has its oxidation number changing from +IV to +III for the nanoparticles and for the microparticles. An explanation would be that the nanoparticles obtained by solvothermal synthesis are surrounded with organic molecules playing the role of stabilizers. The thermal breakdown of such molecules, in the presence of oxygen, during anneal step 30, may result in the forming of reducing gases which favor the changing of the oxidation number of the cerium from +IV to +III, or at least, which enable to preserve the initial +III oxidation state. The anneal step further improves the crystallinity of the YAG and favors the rearrangement of the cerium atoms in the YAG matrix for a more homogeneous distribution of the cerium. This translates as a very significant increase in the absorption of visible light by the material after anneal step 30, as appears in the tests described hereafter.

The mixture of powders may be added to a binder, for example, a resin, to form a coating.

Figure 3:
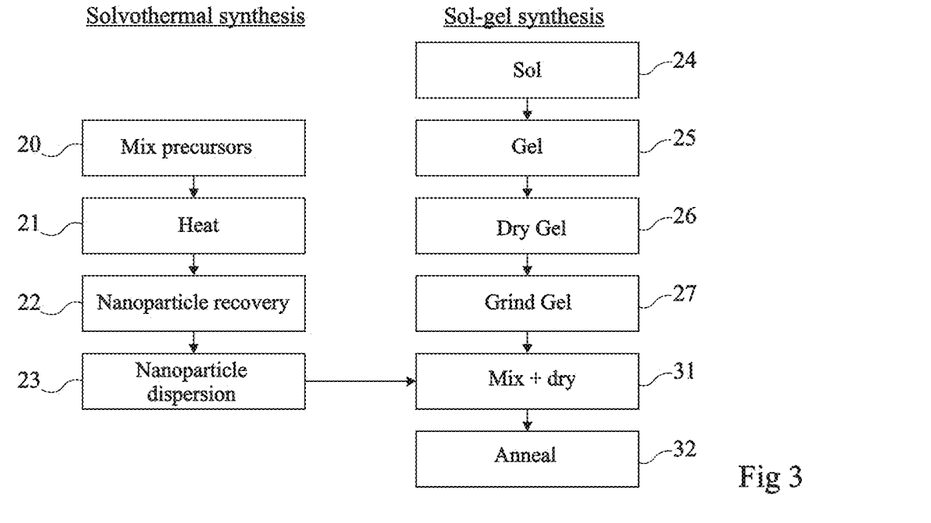

FIG. 3 shows, in the form of a block diagram, another embodiment of a method of manufacturing photoluminescent material 10 shown in FIG. 1.

This embodiment comprises previously-described steps 20, 21, 22, 23, 24, 25, 26, and 27. After step 27, the method carries on at step 31.

At step 31, the colloidal nanoparticle dispersion obtained at step 23 is mixed with the xerogel powder obtained at step 27. A drying step, for example, at a temperature between 25° C. and 90° C. and for a time in the range from 2 hours to 12 hours, may be provided to evaporate the solvent from the colloidal dispersion. A powder comprising a mixture of the xerogel and of nanoparticles is obtained. The method carries on at step 32.

Step 32 is an anneal step identical to previously-described step 28. It enables to obtain the photoluminescent material according to the embodiment of FIG. 3 having the desired chemical composition and crystalline structure while enabling the oxidation number of the cerium to change from +IV to +III. The nanoparticle size tends to increase during step 32. After anneal step 32, the average nanoparticle size is in the range from 100 nm to 900 nm, preferably from 400 nm to 900 nm.

Figure 4:
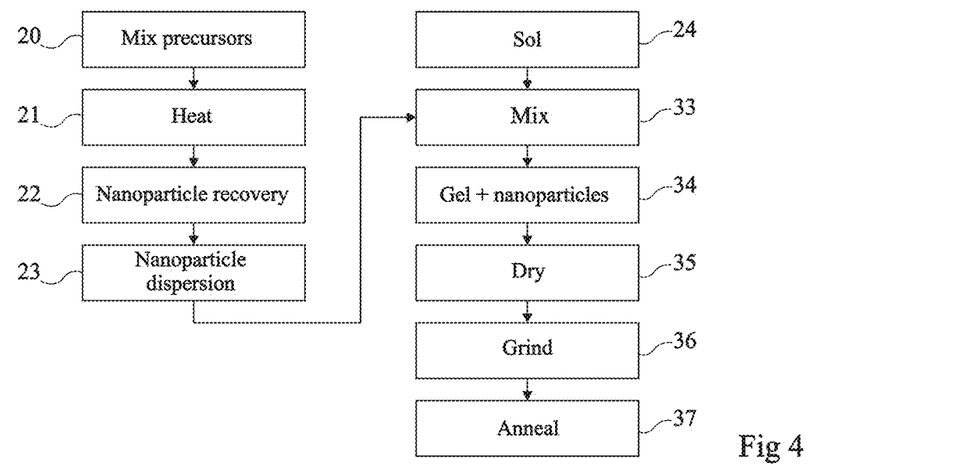

FIG. 4 shows, in the form of a block diagram, another embodiment of a method of manufacturing photoluminescent material 10 shown in FIG. 1.

This embodiment comprises previously-described steps 20, 21, 22, 23, and 24. After step 24, the method carries on at step 33.

At step 33, the colloidal dispersion of nanoparticles obtained at step 23 is mixed with the sol obtained at step 24, preferably before the forming of the gel. After the gelling, a gel where the nanoparticles are dispersed is obtained. The method carries on at step 35.

Step 35 corresponds to a gel drying step similar to previously-described step 26. A xerogel where the nanoparticles are dispersed is obtained. The method carries on at step 36.

Step 36 corresponds to a xerogel drying step similar to previously-described step 27. It enables to obtain a mixture of powder of the xerogel and of nanoparticles. The method carries on at step 37.

Step 37 corresponds to an anneal step similar to previously-described step 28. It enables to obtain photo-luminescent material 10 according to the embodiment of FIG. 4 having the desired composition and crystalline structure while enabling, in particular, to preserve the +III oxidation number of the cerium and/or the changing of the oxidation number of the cerium from +IV to +III. The nanoparticle size tends to increase during step 37. After anneal step 37, the average nanoparticle size is in the range from 100 nm to 900 nm, preferably from 400 nm to 900 nm.

In the previously-described embodiments of manufacturing methods, the forming of microparticles by a sol-gel method and the forming of nanoparticles by solvothermal synthesis enable to obtain a more homogeneous chemical composition, since the microparticles and the nanoparticles are obtained by wet method with a control of the precursors at the molecular scale and are mixed with one another in solution while stirring, and a better control of the grain size of the particles obtained as compared with a synthesis by solid-state reaction. Further, the anneal steps may advantageously be carried out in a free air atmosphere.

Examples of photoluminescent materials have been manufactured according to the embodiments of manufacturing methods previously described in relation with FIGS. 2, 3, and 4. For these examples, the first and second photoluminescent substances are identical and correspond to YAG:$Ce^{3+}$. These photoluminescent materials appear in the form of a powder of a mixture of YAG:$Ce^{3+}$ microparticles obtained by a sol-gel method and of YAG:$Ce^{3+}$ nanoparticles obtained by solvothermal synthesis by using the glycol method. Call mass ratio R of the mixture the ratio of the proportion of YAG:$Ce^{3+}$ microparticles obtained by a sol-gel in the mixture and the proportion of YAG:$Ce^{3+}$ nanoparticles obtained by solvothermal synthesis in the mixture.

According to an embodiment, the precursors used for the manufacturing of the YAG:$Ce^{3+}$ nanoparticles by solvothermal synthesis are hydrated yttrium acetate (III), hydrated cerium acetate (III), and aluminum isopropoxide. Hydrated yttrium acetate (III) corresponds to the product commercialized by Strem Chemicals with product number 93-3930. Hydrated cerium acetate (III) corresponds to the product commercialized by Aldrich with product number 529559. The aluminum isopropoxide corresponds to the product commercialized by Alfa Aesar with product number 14007. The precursors used for the manufacturing of the YAG:$Ce^{3+}$ microparticles by a sol-gel method are anhydrous yttrium chloride, anhydrous cerium chloride, and aluminum isopropoxide. The anhydrous yttrium chloride corresponds to the product commercialized by Alfa Aesar with product number 18682. The anhydrous cerium chloride corresponds to the product commercialized by Alfa Aesar with product number 21112, and the aluminum isopropoxide corresponds to the product commercialized by Alfa Aesar with product number 14007.

For examples using a colloidal dispersion of YAG:Ce nanoparticles, the colloidal dispersion has been formed by mixing 56.16 mmol of hydrated yttrium acetate, 0.05 mmol of hydrated cerium acetate (III), and 94.55 mmol of aluminum isopropoxide in a mixture of solvents comprising 450 mL of 1,4-butanediol and 60 mL of diethylene glycol. The mixture has been heated in an autoclave at 300° C. for 1 hour. The obtained colloidal dispersion has been cooled down to the room temperature. The nanoparticles have been precipitated by addition of excess acetonitrile. The solid phase has been recovered by centrifugation, and has then been dried at 80° C. for 12 hours to form a nanoparticle powder. For the mixing with the sol-gel powders, a determined mass of this powder has been dispersed in ethanol with a 2.5% nanoparticle mass concentration.

For examples using a YAG:Ce sol, the sol may be formed by mixing 15 mmol of $YCl_3$ and 0.15 mmol of $CeCl_3$ in 200 mL of isopropanol. The mixture is heated up to 85° C. for 30 min. Then, 150 mL of a solution of NaH at 0.51 mol/L in isopropanol are added to the solution of precursors of $YCl_3$ and of $CeCl_3$ while vigorously stirring. The mixture is heated up to 85° C. After 1 h of heating, 26 mmol of aluminum isopropoxide are weighted and added to the mixture. The reaction carries on while vigorously stirring for 4 hours at 85° C. At the end of the reaction, the separation of the YAG:Ce sol from the NaCl salts is finally carried out as previously described.

Measurements of the internal quantum efficiency, $QY_{int}$, of the absorption coefficient, Abs, and of the external quantum efficiency, $QY_{ext}$, have been carried out for the manufactured photoluminescent powders. Internal quantum efficiency $QY_{int}$, absorption coefficient Abs, and external quantum efficiency $QY_{ext}$ are defined by the following relations (2):

$$QY_{int} = N_{em}/N_{abs} \quad (2)$$

$$Abs = N_{abs}/N_{exe}$$

$$QY_{ext} = QY_{int} * Abs$$

where $N_{em}$ and $N_{abs}$ respectively are the number of photons emitted and absorbed by the photoluminescent substance, $N_{exc}$ is the total number of photons emitted by the excitation source. Values $QY_{int}$ and Abs are directly provided by the measurement device. External quantum efficiency $QY_{ext}$ can thus be deduced from these values.

The measurements of internal quantum efficiency $QY_{int}$ and of absorption coefficient Abs have been performed by using a Hamamatsu CG-2 spectrometer (250-900 nm) equipped with an integrating sphere. The values of external quantum efficiency $QY_{ext}$ are provided with a 5% error margin.

Comparison Example 1

A powder of YAG:$Ce^{3+}$ microparticles commercialized by Phosphortechnology under reference QMK58/F-U1 has been used as a comparison photoluminescent material. The average particle size was 5 µm. The microparticles are obtained by synthesis by solid-state reaction.

Internal quantum efficiency $QY_{int}$, absorption coefficient Abs, and external quantum efficiency $QY_{ext}$ have been measured. The obtained results are gathered in Table (I) here-after:

TABLE I

| $QY_{int}$ (%) | Abs | $QY_{ext}$ (%) |
|---|---|---|
| 95 | 0.73 | 70 |

Comparison Example 2

YAG:Ce sols have been formed as previously described. Sols have been dried at a 80° C. temperature for 4 hours to obtain a xerogel. The xerogel has been ground in a mortar to form the precursor powder. The powder has been annealed for 4 hours at different temperatures.

Internal quantum efficiency $QY_{int}$, absorption coefficient Abs, and external quantum efficiency $QY_{ext}$ have been measured. The obtained results are gathered in Table (II) hereafter:

TABLE II

| Mass ratio R | Heating temperature (° C.) | $QY_{int}$ (%) | Abs | $QY_{ext}$ (%) |
|---|---|---|---|---|
| 100/0 | 1500 | 97 | 0.45 | 44 |
| 100/0 | 1600 | 90 | 0.5 | 45 |
| 100/0 | 1700 | 89 | 0.58 | 52 |

Figure 5:
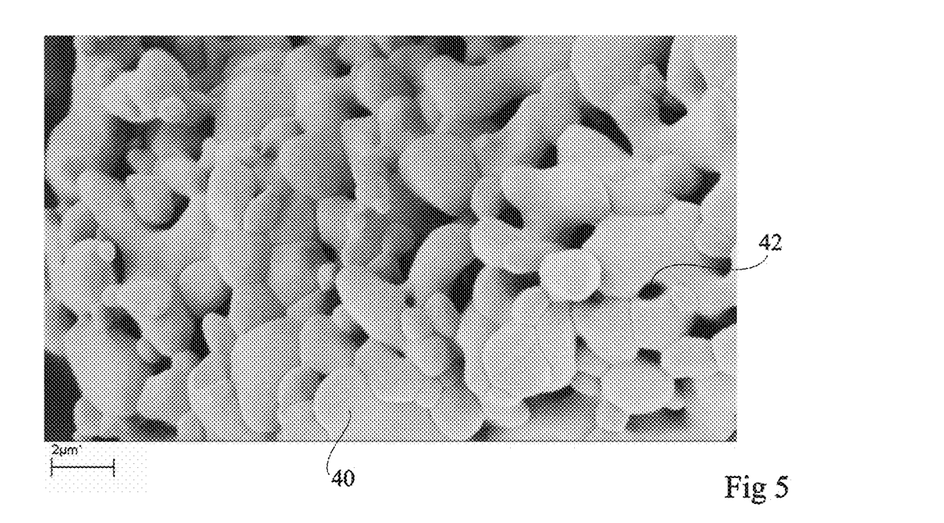
FIG. 5 is a photograph obtained by scanning electron microscopy of a powder of photoluminescent microparticles.

FIG. 5 is a photograph obtained by scanning electron microscopy of the microparticle powder for which the heating temperature was 1,700° C. As appears in FIG. 5, YAG:$Ce^{3+}$ micro-particles 40 are separated by interstices 42 filled with air.

External quantum efficiency $QY_{ext}$ of the powder only comprising microparticles obtained according to a sol-gel method is lower by more than 25% than the quantum efficiency of the powder of example 1.

Comparison Example 3

Colloidal dispersions of nanoparticles have been formed as previously indicated. The colloidal dispersions have been dried at a 85° C. temperature for 2 hours and have then been annealed in the same conditions as the microparticle powder, for comparison purposes. Before the anneal, the average nanoparticle size was 40 nm. After the anneal, the average nanoparticle size was in the range from 100 nm to 900 nm.

Internal quantum efficiency $QY_{int}$, absorption coefficient Abs, and external quantum efficiency $QY_{ext}$ have been measured. The obtained results are gathered in Table (III) hereafter:

TABLE III

| Mass ratio R | Anneal temperature (° C.) | $QY_{int}$ (%) | Abs | $QY_{ext}$ (%) |
|---|---|---|---|---|
| 0/100 | 1500 | 49 | 0.71 | 35 |
| 0/100 | 1600 | 46 | 0.785 | 36 |
| 0/100 | 1700 | 47 | 0.88 | 41 |

Figure 6:
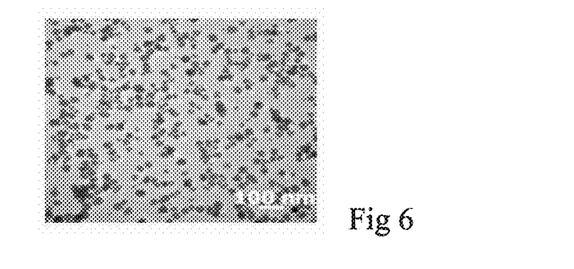
FIG. 6 is a photograph obtained by transmission electron microscopy of a powder of nanoparticles before anneal.

FIG. 6 is a photograph obtained by transmission electron microscopy of a colloidal dispersion of YAG:Ce nanoparticles obtained by solvothermal method before the thermal anneal step.

Figure 7:
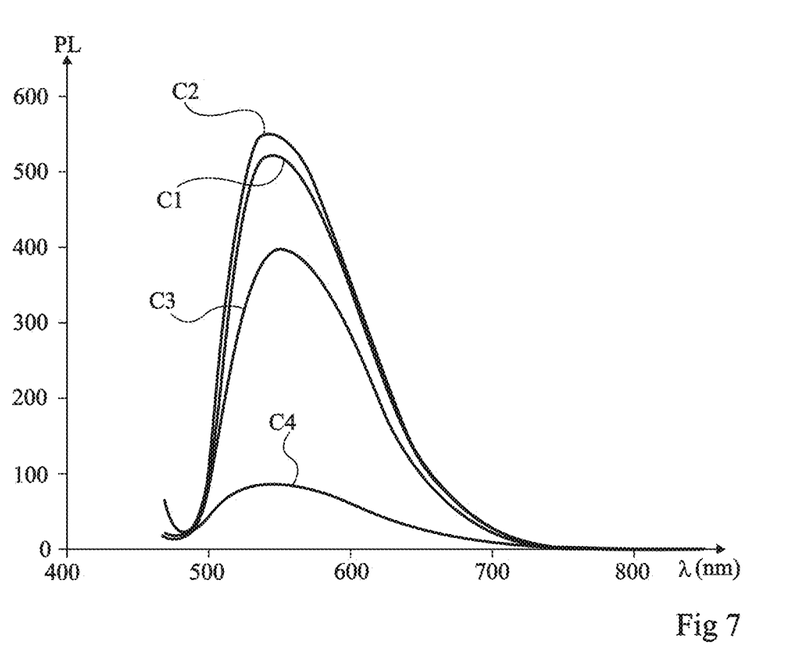
FIG. 7 shows curves of the variation of the photoluminescence intensity of a powder of photoluminescent nanoparticles before and after anneal at different temperatures.

FIG. 7 shows curves C1, C2, C3, and C4 of the variation of photoluminescence intensity PL, in arbitrary units, according to wavelength k, in nanometers, for different anneal temperatures, of the radiation emitted by the photoluminescent powders manufactured in example 3 excited by a light radiation having a 460-nm wavelength. Curves C1, C2, and C3 have been respectively obtained for 1,500° C., 1,600° C., and 1,700° C. anneal temperatures. Curve C4 has been obtained in the absence of a thermal anneal step. The thermal anneal enables to increase the photoluminescence intensity of the nanoparticle powder.

Internal quantum efficiency $QY_{int}$ of the powder only comprising nanoparticles obtained by solvothermal synthesis is much lower than internal quantum efficiency $QY_{int}$ of the powder of example 2 only comprising microparticles formed by a sol-gel method. However, absorption coefficient Abs of the nanoparticles is much greater than that of the microparticles. For example, at 1,700° C., the microparticles have an internal quantum efficiency approximately 50% greater than that of the nanoparticles, while absorption coefficient Abs thereof is approximately 35% greater than that of the microparticles.

The inventors have shown that by mixing microparticles and nanoparticles, a compensation of the lack of absorption of the microparticles by the excellent absorption of the nanoparticles is obtained.

Example 4

Mixtures of powders of microparticles and of nanoparticles have been achieved according to the embodiment previously described in relation with FIG. 2 where the colloidal dispersion of nanoparticles is added to the powder of micro-particles after the step of thermal anneal of the microparticles.

Internal quantum efficiency $QY_{int}$, absorption coefficient Abs, and external quantum efficiency $QY_{ext}$ have been measured. The obtained results are gathered in Table (IV) hereafter:

TABLE IV

| Mass ratio R | Heating temperature (° C.) | $QY_{int}$ (%) | Abs | $QY_{ext}$ (%) |
| --- | --- | --- | --- | --- |
| 85/15 | 1700 | 68 | 0.746 | 51 |
| 70/30 | 1500 | 70 | 0.74 | 52 |
| 70/30 | 1600 | 61 | 0.635 | 39 |
| 70/30 | 1700 | 72 | 0.82 | 59 |
| 50/50 | 1700 | 71 | 0.84 | 60 |

Figure 8:
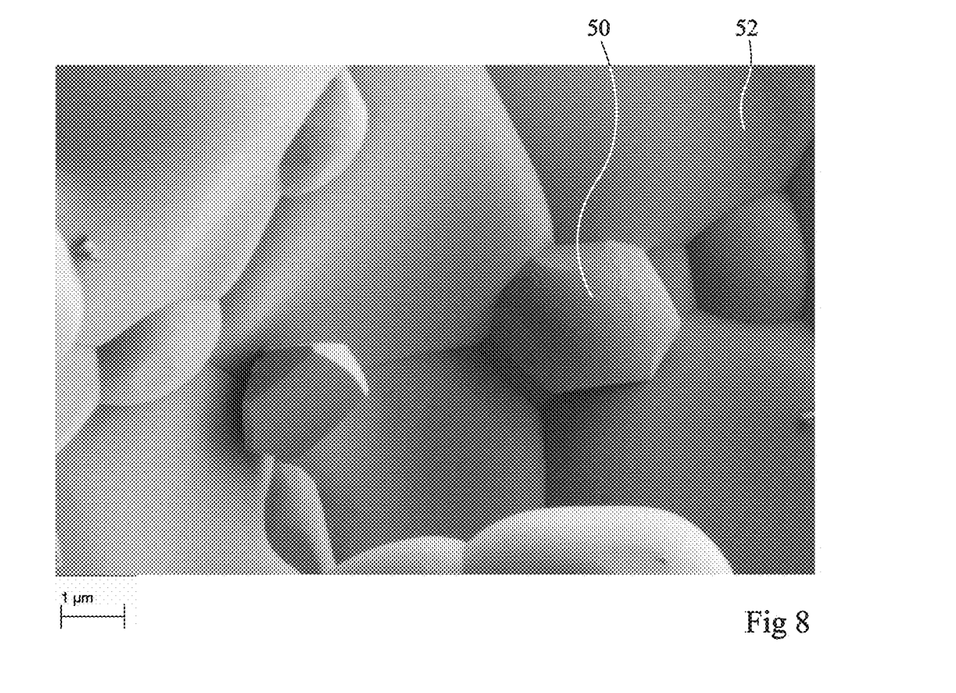
FIG. 8 is a photograph obtained by scanning electron microscopy of a mixture of powders of photoluminescent micro-particles and nanoparticles according to an embodiment of a method of manufacturing the photoluminescent material.

FIG. 8 is a photograph obtained by scanning electron microscopy of the powder of nanoparticles and of microparticles of table (IV) for which ratio R was 70/30 and the heating temperature was 1,700° C. As appears in this drawing, YAG:Ce nanoparticles 50 having an average size smaller than 1 μm are present in the interstices between YAG:Ce microparticles 52 having an average size in the range from 5 to 8 μm. This has resulted in the forming of a dense and compact photoluminescent material 10.

Figure 9:
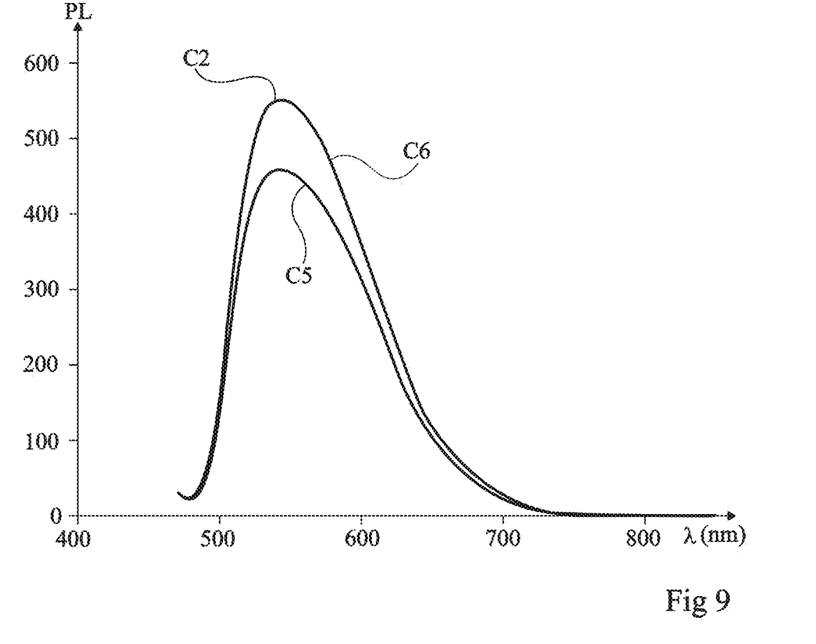
FIG. 9 shows curves of the variation of the photoluminescence intensity of a powder of photoluminescent microparticles and of a mixture of powders of photoluminescent micro-particles and of photoluminescent nanoparticles according to an embodiment of a method of manufacturing the photoluminescent material.

FIG. 9 shows curves C5 and C6 of the variation of photoluminescence intensity PL, in arbitrary units, according to wavelength λ, in nanometers, of the radiation emitted by photo-luminescent powders excited by a light radiation having a 460-nm wavelength. Curve C5 has been obtained for the powder of micro-particles of table (II) for which the heating temperature was 1,700° C. and curve C6 has been obtained for the powder of micro-particles and of nanoparticles of table (IV) for which ratio R was 70/30 and the heating temperature was 1,700° C.

The external quantum efficiency is improved over that of a powder only comprising YAG:$Ce^{3+}$ microparticles formed by a sol-gel method.

Example 5

A mixture of powders of microparticles and of nanoparticles has been achieved according to the embodiment previously described in relation with FIG. 3 where the colloidal dispersion of nanoparticles is added to the powder of the ground xerogel.

Internal quantum efficiency $QY_{int}$, absorption coefficient Abs, and external quantum efficiency $QY_{ext}$ have been measured. The obtained results are gathered in Table (V) here-after:

TABLE V

| Mass ratio R | Heating temperature (° C.) | $QY_{int}$ (%) | Abs | $QY_{ext}$ (%) |
| --- | --- | --- | --- | --- |
| 50/50 | 1700 | 55 | 0.83 | 46 |

Figure 10:
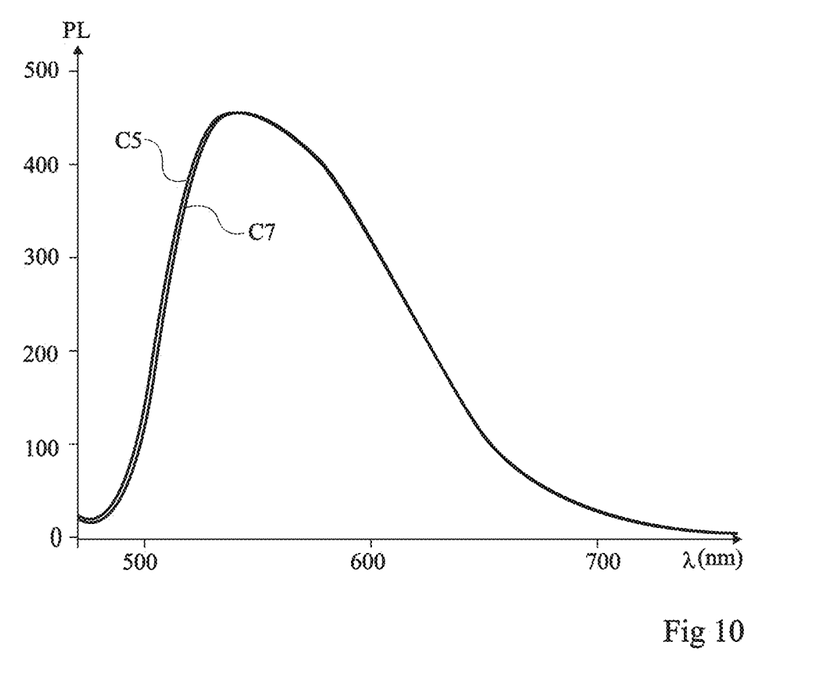
FIG. 10 is a diagram similar to FIG. 9 for another embodiment of a method of manufacturing the photoluminescent material.

FIG. 10 shows curves C5 and C7 of the variation of photoluminescence intensity PL, in arbitrary units, according to wavelength λ, in nanometers, of the radiation emitted by photo-luminescent powders excited by a light radiation having a 460-nm wavelength. Curve C6 has been obtained of the microparticle powder of table (V).

The external quantum efficiency is not improved over that of a powder only comprising YAG:$Ce^{3+}$ microparticles.

Example 6

Mixtures of powders of microparticles and of nanoparticles have been achieved according to the embodiment previously described in relation with FIG. 3 where the colloidal dispersion of nanoparticles is added to the sol before the gel is obtained.

Internal quantum efficiency $QY_{int}$, absorption coefficient Abs, and external quantum efficiency $QY_{ext}$ have been measured. The obtained results are gathered in Table (VI) hereafter:

TABLE VI

| Mass ratio R | Heating temperature (° C.) | $QY_{int}$ (%) | Abs | $QY_{ext}$ (%) |
| --- | --- | --- | --- | --- |
| 80/20 | 1700 | 88 | 0.8 | 70 |
| 70/30 | 1700 | 84 | 0.78 | 66 |
| 50/50 | 1700 | 66 | 0.85 | 56 |
| 30/70 | 1700 | 69 | 0.82 | 57 |

Figure 11:
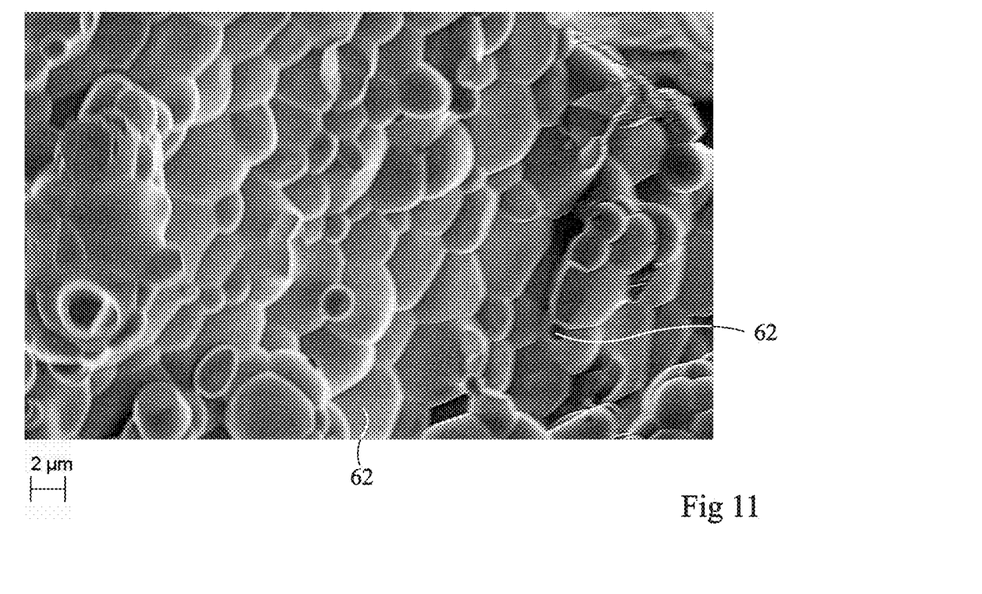
FIG. 11 is a photograph similar to FIG. 8 for another embodiment of a method of manufacturing the photoluminescent material.

FIG. 11 is a photograph obtained by scanning electron microscopy of the powder of nanoparticles and of microparticles of table (VI) for which ratio R was 80/20. As appears in this drawing, YAG:Ce nanoparticles 60 having an average size smaller than 1 μm are present in the interstices between YAG:Ce microparticles 62 having an average size in the range from 3.5 to 6 μm. This has resulted, as in example 4, in the forming of a dense and compact photoluminescent material 10.

Figure 12:
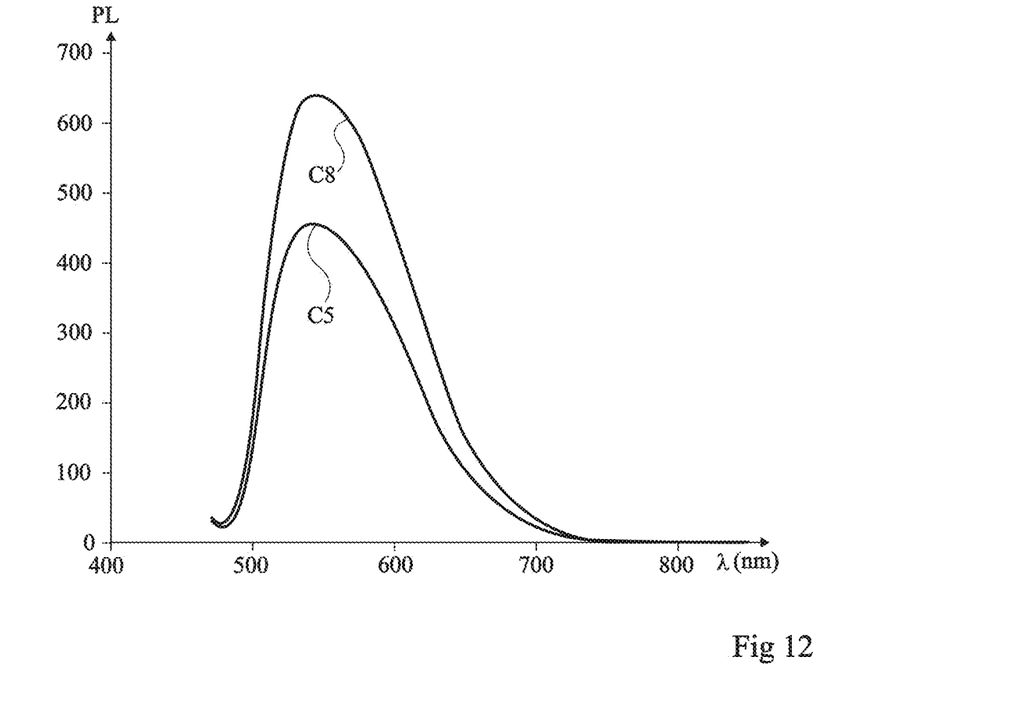
FIG. 12 is a diagram similar to FIG. 10 for another embodiment of a method of manufacturing the photoluminescent material.

FIG. 12 shows curves C5 and C8 of the variation of photoluminescence intensity PL, in arbitrary units, according to wavelength λ, in nanometers, of the radiation emitted by photo-luminescent powders excited by a light radiation having a 460-nm wavelength. Curve C8 has been obtained for the microparticle powder of table (VI) for which mass ratio R was 80/20. This curve shows a clear improvement of intensity PL over the powder of microparticles alone obtained by the sol-gel method and annealed in the same conditions.

Further, external quantum efficiency $QY_{ext}$ of the powders formed at example 6 is close to external quantum efficiency $QY_{ext}$ of the powder of example 1. External quantum efficiency $QY_{ext}$ of the powder of example 6 having mass ratio 80/20 is equal to external quantum efficiency $QY_{ext}$ of the powder of example 1. A photoluminescent having as high a performance as commercialized powders resulting from solid-state syntheses has thus been obtained by sol-gel method with no treatment in a hydrogen atmosphere.

The invention claimed is:

1. A method of manufacturing a photoluminescent material, comprising the steps of:
   (1) manufacturing according to a sol-gel method a sol and then a gel of first precursors of a first photoluminescent substance from the sol;
   (2) grinding the gel;
   (3) manufacturing a colloidal dispersion of second particles of a second photoluminescent substance, different from the first photoluminescent substance or identical to the first photoluminescent substance, having an average size in the range from 5 nm to 400 nm, step (3) comprising a step of solvothermal synthesis of the second particles;
   (4) mixing the colloidal dispersion with the sol at step (1) before the forming of the gel or annealing the gel to form first particles of the first substance having an average size in the range from 1 μm to 20 μm and mixing the colloidal dispersion with the first particles; and
   (5) annealing the mixture obtained at step (4), which results in an increase in the compactness of the mixture, the average size of the second particles after anneal being in the range from 100 nm to 900 nm;
   wherein the first photoluminescent substance and the second photoluminescent substance each comprise an yttrium aluminum oxide.

2. The method of claim 1, wherein the anneal step at step (6) is carried out at a temperature in the range from 1,100° C. to 1,700° C.

3. The method of claim 1, wherein the colloidal dispersion is in a solvent comprising at least one alcohol.

4. The method of claim 1, wherein the first photoluminescent substance and the second photoluminescent substance each mainly comprise an yttrium aluminum oxide further containing at least one of the following elements: cerium, europium, chromium, neodymium, terbium, dysprosium, praseodymium, or gadolinium.

5. The method of claim 1, wherein the mass ratio of the first particles and of the second particles is in the range from 0.01 to 99.

6. The method of claim 1, wherein the first photoluminescent substance comprises YAG:Ce particles and the second photoluminescent substance comprises YAG:Ce nanoparticles prepared by solvothermal method.

\* \* \* \* \*